US006486402B2

(12) United States Patent
Harger et al.

(10) Patent No.: US 6,486,402 B2

(45) Date of Patent: Nov. 26, 2002

(54) CABLE GROUNDING CLAMP

(75) Inventors: Timothy R. Harger, Libertyville; Spencer Heynis, Wauconda; Lloyd Lewallen, Mundelein, all of IL (US)

(73) Assignee: Harger, Inc., Grayslake, IL (US)

(*) Notice: Subject to any disclaimer, the term of this patent is extended or adjusted under 35 U.S.C. 154(b) by 0 days.

(21) Appl. No.: 09/837,400

(22) Filed: Apr. 18, 2001

(65) Prior Publication Data

US 2002/0153157 A1 Oct. 24, 2002

(51) Int. Cl.[7] ........ H02G 15/02

(52) U.S. Cl. ........ 174/78

(58) Field of Search ........ 174/74 R, 75 C, 174/78; 439/98, 795

(56) References Cited

U.S. PATENT DOCUMENTS

| | | | | | |
|---|---|---|---|---|---|
| 1,616,847 | A | * | 2/1927 | Feige | 173/105 |
| 1,809,009 | A | * | 6/1931 | Andre | 24/279 |
| 2,554,169 | A | * | 5/1951 | Bergan | 439/795 |
| 4,912,809 | A | * | 4/1990 | Scheuer | 16/413 |
| 4,973,259 | A | * | 11/1990 | Sachs | 248/61 |
| 5,929,383 | A | * | 7/1999 | Marik et al. | 174/78 |

OTHER PUBLICATIONS

"Andrew Catalog 37", Andrew Corporation, Orland Park, IL, copr. 1997, front and back cover and p. 215.

"MTS Wirless Components—Buying Guide 1999", cover and pp 56–58.

* cited by examiner

*Primary Examiner*—Chau N. Nguyen
(74) *Attorney, Agent, or Firm*—Cook, Alex, McFarron, Manzo, Cummings & Mehler, Ltd.

(57) ABSTRACT

A staking nut and a grounding clamp with the staking nut are disclosed in which the clamp includes a flexible metal strap with openings through the ends of the strap. Threaded studs extend through the openings at one end of the strap to firmly attach the lug of a grounding conductor to the strap. The staking nuts are provided through the openings at the other end of the strap to prevent removal of the nuts from the strap, but permit rotation so that the nuts while held captive to the strap may be threaded upon the threaded studs to clamp the grounding clamp to a coaxial cable which is to be grounded.

15 Claims, 1 Drawing Sheet

CABLE GROUNDING CLAMP

BACKGROUND AND SUMMARY OF THE INVENTION

The present invention relates to a staking nut, and more particularly, to a cable grounding clamp having the staking nuts captive thereon for achieving the clamping function.

Grounding clamps for cables, such as coaxial cables on wireless telephone communication towers, have been employed in the past to ground the cables to protect against damage from lightning strikes. In use the outermost insulative jacket of the coaxial cable to be grounded is stripped where the clamp is to be applied. This will expose a conductive sheath of the cable beneath the jacket. A conductive copper strap is bent around the conductive sheath, and the strap is then clamped around the conductive sheath by applying individual lock washers over threaded rivet studs and threading conventional nuts on the studs to tighten the strap clamp in electrically conductive relationship to the coaxial cable sheath. In turn, the threaded rivet studs also act to rivet the lug of the grounding conductor to the strap clamp.

Such prior grounding clamps suffer several disadvantages. One disadvantage is the difficulty of installation due to the number of distinct individual pieces that must be manipulated to complete the clamping procedure. This is particularly a problem in such grounding clamps when it is considered that they are applied to coaxial cables at considerable altitudes above the ground by personnel who are suspended at that altitude during the application of the grounding clamps. Due to the multiple individual parts and the small size of some of their components such as the nuts and lock washers, the possibility exists that while the nuts are tightened, the nuts and lock washers may be dropped and lost.

The present invention overcomes these disadvantages in a simple and inexpensive manner. In the present invention the nuts which are utilized to achieve the clamping function are captive to the strap itself, but still capable of rotation relative to the fixed threaded studs or rivets to complete the clamping function. Moreover, the need for lock washers is obviated. Because the nuts are captive to the strap, they are easier to handle during installation and not subject to being dropped and lost during that procedure.

In one principal aspect of the present invention, a staking nut comprises a block portion having a face, and at least one surface adapted to be engaged by a tool to rotate the block portion. A passage extends into the block portion from the face, and the passage is threaded to receive a threaded stud therein. A substantially cylindrical staking shaft is on the block portion and extends from the face. The staking shaft has a given external cross-sectional dimension and also includes a passage which is coaxial with the passage of the block portion, with the staking shaft passage having a minimum cross-sectional dimension which is at least as large as the maximum cross-sectional dimension of the passage in the block portion. The staking shaft is formed of a material which is capable of expansion to an external cross-sectional dimension which is greater than the given external cross-sectional dimension.

In another principal aspect of the present invention, the block portion and staking shaft are formed in integral one piece relationship to each other.

In still another principal aspect of the present invention, the block portion and staking shaft are formed of the same material.

In still another principal aspect of the present invention, the material of the staking shaft is deformable to produce the expansion.

In still another principal aspect of the present invention, a grounding clamp comprises a flexible elongate metal strap having first and second ends; an elongate threaded stud at the first end of the strap; and a nut at the second end of the strap. The nut has a threaded passage therein aligned to threadedly receive the threaded stud into the threaded passage of the nut to attach the first and second ends together. A coupling couples the nut to the second end of the strap to prevent removal of the nut from the second end of the strap, but permit rotation of the nut relative to the stud while the nut is coupled to the second end to thread the nut onto the threaded stud.

In still another principal aspect of the present invention, the stud is non-rotatably fixed to the first end of the strap.

In still another principal aspect of the present invention, the aforementioned grounding clamp includes a conductor with a lug thereon, and the stud comprises a rivet which mounts the lug to the first end of the strap.

In still another principal aspect of the present invention, the strap has at least one opening through the strap adjacent the second end, and the nut and coupling comprise the aforementioned staking nut which is captive in the opening.

These and other objects, features and advantages of the present invention will be more clearly understood through a consideration of the following detailed description.

BRIEF DESCRIPTION OF THE DRAWINGS

In the course of this description, reference will frequently be made to the attached drawing in which.

DETAILED DESCRIPTION OF THE PREFERRED EMBODIMENTS

Figures 1, 2, 3, 4:
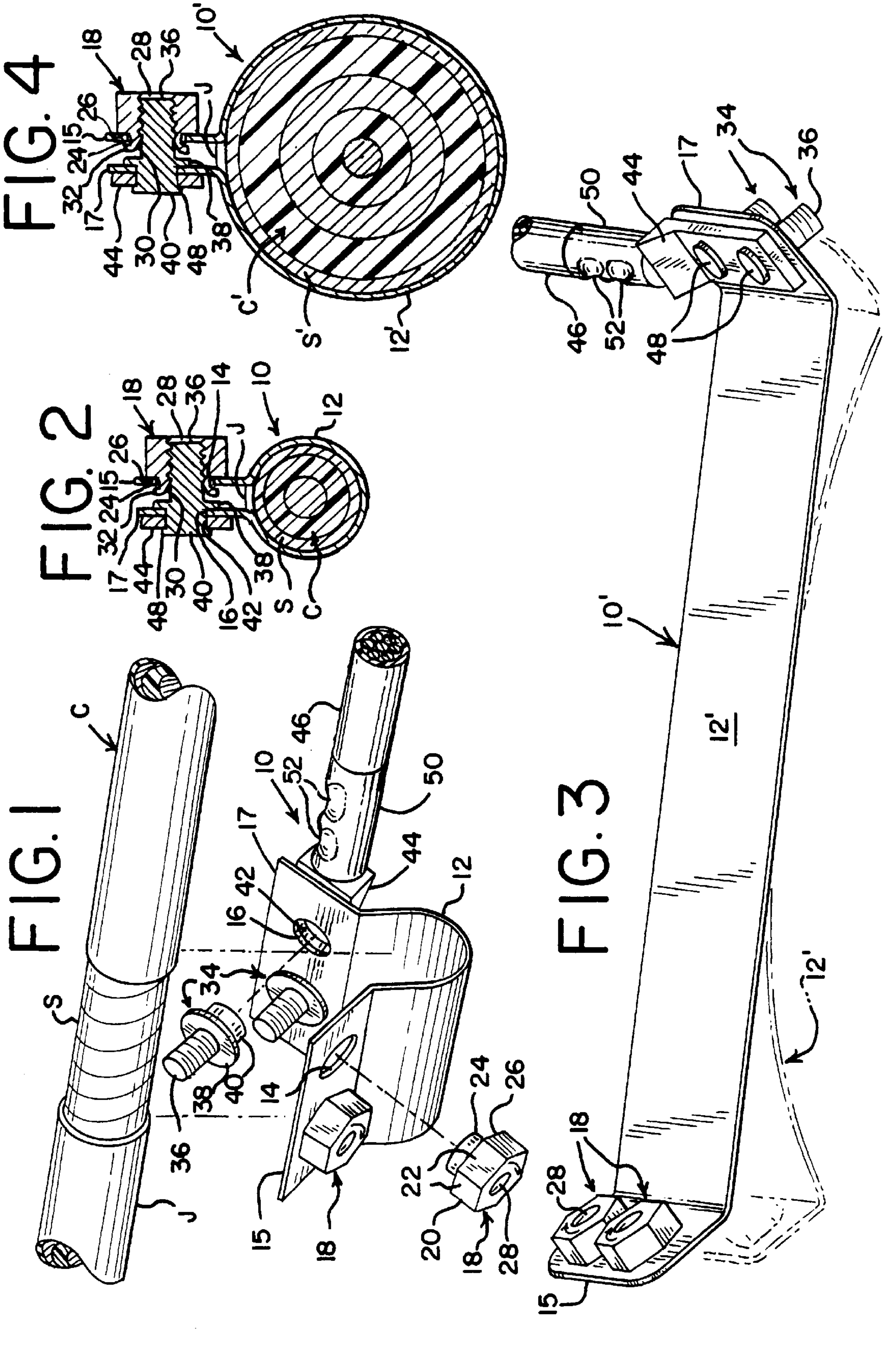
FIG. 1 is an exploded broken perspective view of a coaxial cable and one preferred embodiment of grounding clamp of the present invention.
FIG. 2 is a cross-sectioned end elevational view of the grounding clamp substantially as viewed from the left in FIG. 1, but in the clamping position on the coaxial cable.
FIG. 3 is a broken perspective view of a second preferred embodiment of grounding clamp of the present invention.
FIG. 4 is a cross-sectioned end elevational view of the second embodiment of grounding clamp substantially as shown in FIG. 3, but in the clamping position on the coaxial cable.

In the first preferred embodiment of the present invention as shown in FIGS. 1 and 2, a grounding clamp 10 comprises a flexible metal strap 12 of a conductive metal, such as copper. The strap 12 is typically elongate, and as shown in FIG. 1 is preformed to fit about the circumference of a coaxial cable C which is to be grounded. Preforming is particularly desirable where the coaxial cable diameters are relatively small. With such cables it is more difficult to precisely bend the strap to conform to the cable at the time of installation than where the cable diameters are larger.

Openings 14 and 16 are formed in end flanges 15 and 17, respectively, at each end of the strap as seen in FIGS. 1 and 2. An important feature of the present invention is the provision of nuts 18 which are captive to the strap 12. As seen in FIGS. 1 and 2 each of the nuts 18 comprises a block portion 20 having flat side edge faces 22 which are adapted to receive a tool for turning the nuts. A staking shaft 24 extends from one face 26 of the block portion 20 and a threaded passage 28 extends from the face 26 preferably through the thickness of the block portion 20. A preferably unthreaded passage 30, which may be somewhat flared in the direction away from the threaded passage 28, also extends through the staking shaft 24 in coaxial alignment with the threaded passage 28 in the block portion. The exterior cross-sectional dimension, e.g. diameter, of the staking shaft 24 is preferably somewhat smaller than the cross-sectional dimension or diameter of the opening 14 to permit the staking shaft to loosely pass through and rotate within the opening 14.

Once the staking shaft 24 has been positioned in the opening 14 in end flange 15, a suitable tool is inserted in the opening to passage 30 to deform the material of the staking shaft 24 so as to expand it to form an enlarged collar 32 on the side of the opening 14 opposite the block portion 20 of the nut. Where the staking shaft 24 is of a relatively flexible material, such as a plastic, the enlarged collar 32 may be preformed on the staking shaft, such as by molding, and first contract or otherwise deformed so as to fit through the opening 14 and then expand back to its original enlarged shape after it has passed through the opening. In either event, the collar 32 is of larger cross-sectional dimension than the opening 14 or the staking shaft 24 as it passes through the opening and thereby couples the nut 18 to the end flange 15 of the strap 12 once the staking shaft 24 has been extended through the opening 14. However, the staking shaft 24 is not deformed or otherwise expanded to the extent that the end flange 15 is gripped between the face 26 of the block portion 20 and the collar 32. Thus, although the nut 18 is coupled to the strap, it is capable of rotation in the opening 14 and relative to the end flange 15.

The block portion 20 and staking shaft 24 of the nut 18 are preferably formed as one piece of the same material. The material is one which is sufficiently soft to permit its deformation to form the collar 32 as previously described, but still have sufficient strength to maintain its shape and performance in use. Such materials may for example, include brass, copper, aluminum and stainless steel. Because the nut 18 need not be conductive, various temperature resistant plastics may also be used.

The nut 18 is preferably formed from a hexagonal bar stock which is machined to reduce its cross-sectional dimension to form the cylindrical staking shaft 24. In the alternative, the nut 18 may be molded. Once formed, the nut 18 may be drilled and threaded to the extent necessary to form the passages 28 and 30 as shown and described.

The grounding clamp 10 is preferably completed by rivets 34 having a threaded stud 36 which is adapted to be threaded into the threaded passage 28 in the nut 18. The threaded stud 36 includes an enlarged flange 38 and a head 40. The head 40 is dimensioned to pass through the opening 16 in the strap end flange 17, and through an opening 42 in a grounding conductor lug 44 to which the grounding conductor lead 46 is attached. The rivet 34, and in particular its head 40, is formed of a relatively soft, deformable material so that it may be deformed to form an enlargement 48 to firmly attach the rivet 34 and lug 44 in a non-rotatable fashion to the end 17 of the strap 12. The rivet 34 is preferably one piece and may also be brass, copper or one of the other last mentioned metals.

In order to firmly attach the grounding conductor lead 46 to the lug 44, the lug preferably includes a ferrule portion 50 which is preferably formed in integral one-piece relationship to the lug 44. The end of the grounding conductor lead 46 is preferably stripped of its insulative jacket, the conductors in the lead are inserted into the ferrule 50, and the ferrule is crimped at 52 to hold the conductors therein.

A second preferred embodiment of grounding clamp is shown in FIGS. 3 and 4. This grounding clamp 10' is similar in many aspects to the clamp 10 as previously described and as shown in FIGS. 1 and 2. Accordingly, like reference numerals will be used to depict like elements.

The principal difference between the grounding clamp 10' and the clamp 10 is that the clamp 10 has been preformed to some extent to the curvature of the coaxial cable C onto which it is to be installed, whereas the grounding clamp 10' has not been preformed, except for the end flanges 15 and 17, and will be flexed and formed at the time of installation. As previously mentioned, the preformed clamp embodiment 10 shown in FIGS. 1 and 2 is primarily intended for coaxial cables C of smaller diameters in which it is more difficult to accurately form the clamp on site at the time of installation. However, the grounding clamps 10' of FIGS. 3 and 4 are typically employed with larger diameter coaxial cables and may be more readily formed at the time of installation by bending in a manner as depicted by the dot and dash lines in FIG. 3, to precisely conform with the cross-sectional shape and dimensions of the larger cross-sectional dimension coaxial cable C'.

Although it is believed from the foregoing description that the installation of the grounding clamps 10, 10' of the present invention to the coaxial cables C, C' will be apparent to those skilled in the art, a brief description of preferred installation steps follows.

In order to prepare the coaxial cables C, C' to receive the grounding clamp 10, 10', the insulated jacket J is removed over a portion of the length of the cable which corresponds approximately to the width of the flexible strap 12, 12' to expose the underlying conductive grounding sheath S, S' of the cable which is just beneath the jacket J.

At this time, the flexing of the preformed strap 12 is completed to extend around the coaxial cable C and its conductive sheath S or, the strap 12' is flexed and formed to extend around its coaxial cable C' and the sheath S'. Because the installation of the clamp 10 is essentially the same as for the clamp 10' from this point on, the further installation of the clamp C will only be described for simplicity.

Once the grounding clamp 10 is positioned about the coaxial cable C and its sheath S, its threaded studs 36 will face into the passage 30 in the staking shaft 24 of nuts 18, and come into contact with the threads in the threaded passage 28 of the nuts 18. Because the nuts 18 are held captive to the flange 15 in a manner which permits rotation of the nuts, the nuts may be easily rotated to thread onto the fixed threaded studs and draw the flanges 15 and 17 together, as seen in FIG. 2, and firmly mount the strap 12 to the conductive sheath S of the coaxial cable C.

When threading the nuts 18 onto the threaded studs 36, the threading is preferably completed when the end of the threads of threaded passage 28 adjacent the face 26 of the nut 18 reaches the inward end of the threads of the threaded stud 36. At this point, the collar 32 of the staking shaft 24 may either be spaced slightly from the flange 38 of its comparable rivet 34 as seen in FIGS. 2 and 4, or come to bear against it. This acts to prevent over tightening and yet permit sufficient play of the staking shaft 24 in the opening 14. In this position the outer face of the end flange 15 will be spring loaded against the faces 26 of nuts 18. Thus, this spring loaded frictional engagement will function like a lock washer to reduce the possibility that the nuts might rotate off the threaded studs 36 so as to loosen the clamp.

From the foregoing it will be appreciated that the nuts and grounding clamps of the present invention provide a captive assembly which prevents loss of the nuts both as they are being installed as well as in service, and greatly facilitate the installation of the assembly. Moreover, lock washers which would otherwise result in additional pieces to manipulate and manage are also avoided by the outward spring force which is exerted by the end flange 15 of the straps 12, 12' once installation has been completed.

It will be understood that the embodiments of the present invention which have been described are merely illustrative of a few of the applications of the principles of the invention. Numerous modification may be made by those skilled in the art without departing from the true spirit and scope of the invention.

We claim:

1. A staking nut comprising a block portion having a face, and at least one surface capable of being engaged by a tool to rotate the block portion;

a passage extending into said block portion from said face, said passage being threaded to receive a threaded stud therein;

a substantially cylindrical staking shaft on said block portion and extending from said face, said staking shaft having a given external cross-sectional dimension; said staking shaft being formed of a material which is capable of expansion to an external cross-sectional dimension which is greater than said given external cross-sectional dimension; and said staking shaft also including a passage which is coaxial with the passage of said block portion, said staking shaft passage having a minimum cross-sectional dimension prior to expansion which is at least as large as the maximum cross-sectional dimension of the passage in the block portion.

2. The nut of claim 1, wherein said block portion and staking shaft are formed in integral one piece relationship to each other.

3. The nut of claim 2, wherein said block portion and staking shaft are formed of the same material.

4. The nut of claim 3, wherein the material of said staking shaft is deformable to produce said expansion.

5. The nut of claim 1, wherein said block portion and staking shaft are formed of the same material.

6. The nut of claim 5, wherein the material of said staking shaft is deformable to produce said expansion.

7. A grounding clamp comprising:

a flexible elongate metal strap having first and second ends;

an elongate threaded stud at said first end of said strap;

a nut at said second end of said strap, said nut having a threaded passage therein aligned to threadedly receive said threaded stud into said threaded passage of said nut to attach said first and second ends together; and a coupling which couples said nut to said second end to prevent removal of said nut from said second end, but permit rotation of said nut relative to said stud while said nut is coupled to said second end to thread said nut onto said threaded stud.

8. The grounding clamp of claim 7, wherein said stud is non-rotatably fixed to said first end of said strap.

9. The grounding clamp of claim 7, including a conductor with a lug thereon, and said stud comprises a rivet which mounts said lug to said first end of said strap.

10. The grounding clamp of claim 7, wherein said strap has at least one opening through said strap adjacent said second end;

wherein said nut comprises a block portion having a face, at least one surface adapted to be engaged by a tool to rotate the block portion, said threaded passage extending into said block portion from said face; and wherein said coupling comprises a substantially cylindrical staking shaft on said block portion and extending from said face and through said opening, said staking shaft having an external cross-sectional dimension which is less than the cross-sectional dimension of the opening; said staking shaft also including a passage which is coaxial with the threaded passage of said block portion, said staking shaft passage having a minimum cross-sectional dimension which is at least as large as the maximum cross-sectional dimension of the threaded passage in the block portion, and wherein said staking shaft is expanded to define a collar having a cross-sectional dimension which is greater than said cross-sectional dimension of said opening.

11. The grounding clamp of claim 10, wherein said block portion and staking shaft are formed in integral one piece relationship to each other.

12. The grounding clamp of claim 11, wherein said block portion and staking shaft are formed of the same material.

13. The grounding clamp of claim 12, wherein the material of said staking shaft is deformed to define said collar.

14. The grounding clamp of claim 10, wherein said stud is non-rotatably fixed to said first end of said strap.

15. The grounding clamp of claim 10, including a conductor with a lug thereon, and said stud comprises a rivet which mounts said lug to said first end of said strap.

* * * * *